June 23, 1964
E. F. SMALL
3,138,344
SPINNING REEL WITH ADJUSTABLE FLYER AND ONE-WAY BRAKE
Filed Nov. 21, 1961
3 Sheets-Sheet 1
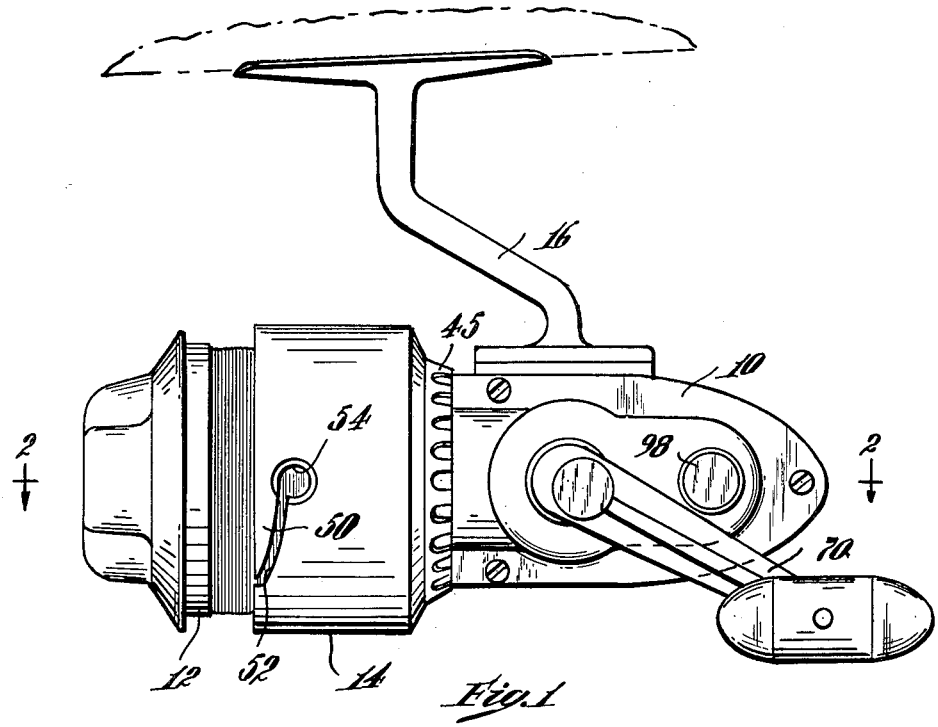
Fig. 1
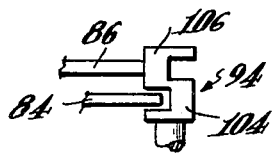
Fig. 6
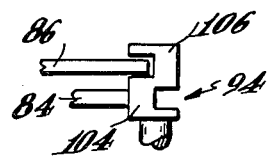
Fig. 7
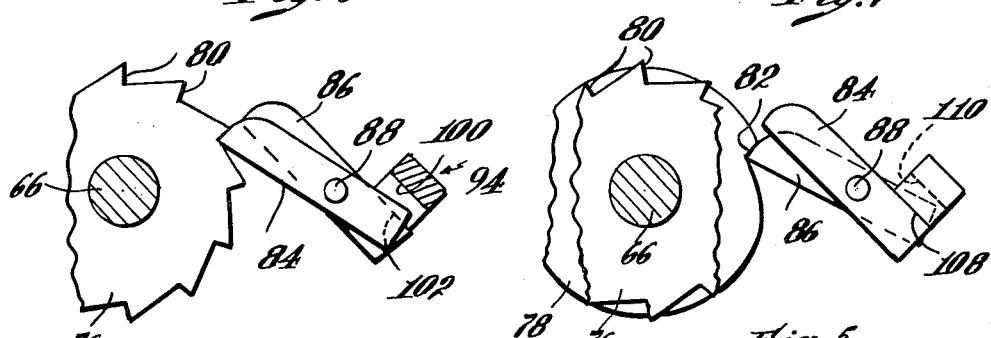
Fig. 4
Fig. 5
INVENTOR.
Edward F. Small
BY
Roberts, Cushman & Grover
ATT'YS

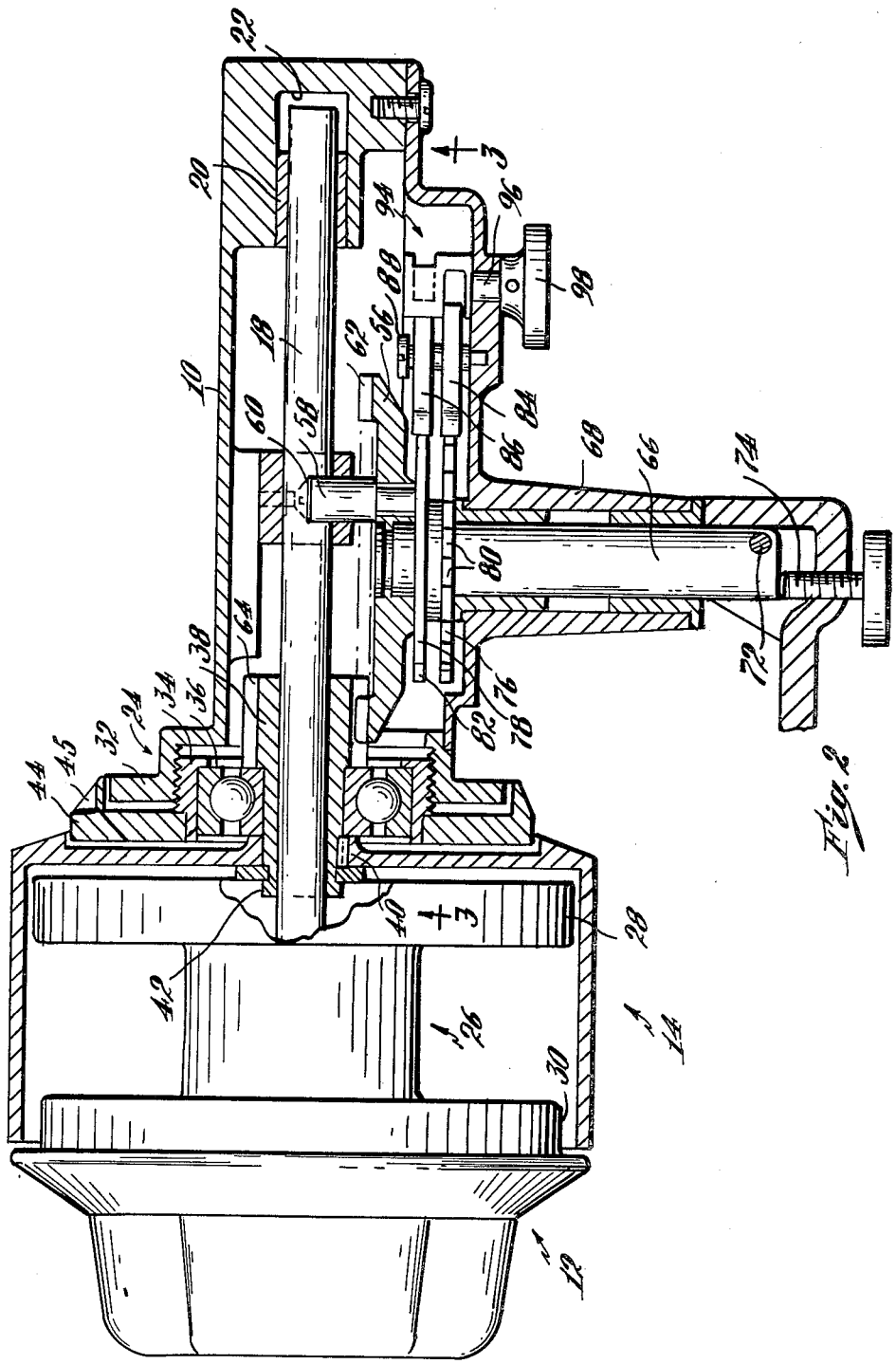

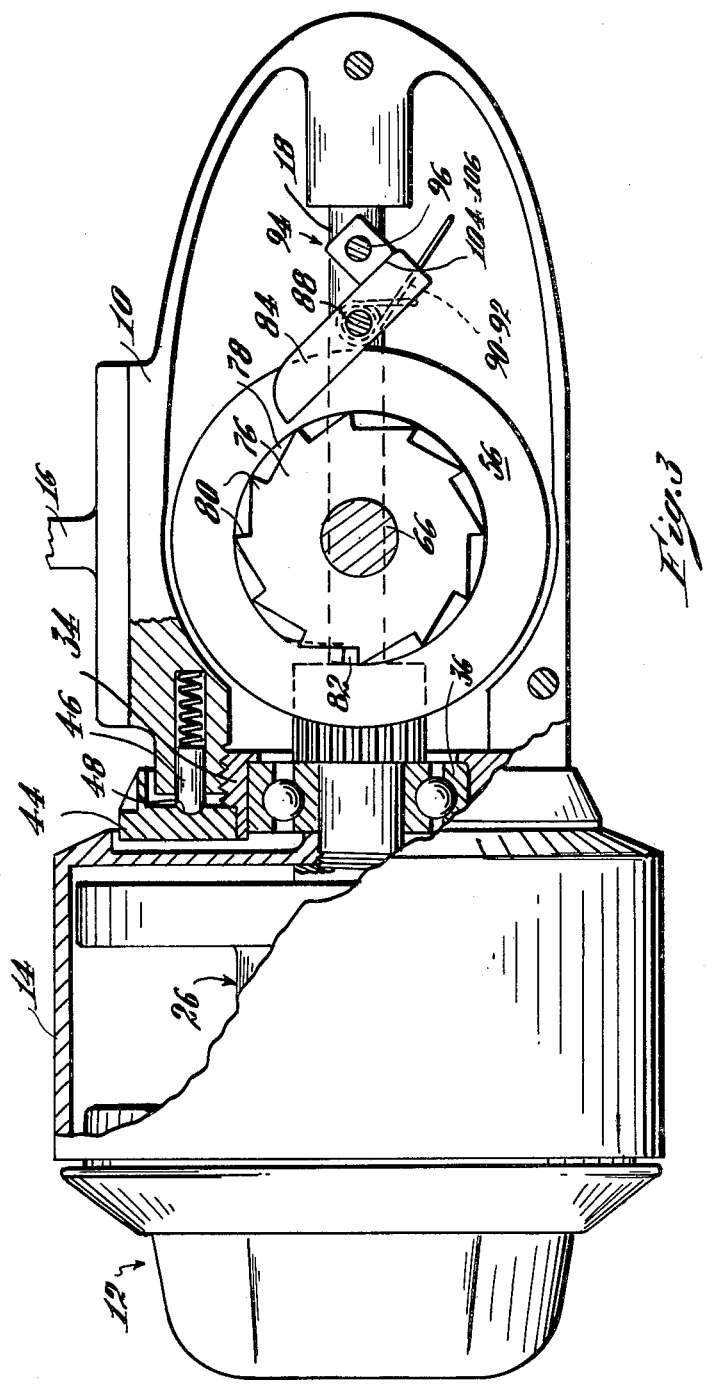

United States Patent Office 3,138,344
Patented June 23, 1964

3,138,344
SPINNING REEL WITH ADJUSTABLE FLYER AND
ONE-WAY BRAKE
Edward F. Small, 32 Howard St., Newton, Mass.
Filed Nov. 21, 1961, Ser. No. 153,912
6 Claims. (Cl. 242—84.21)

This invention relates to fishing reels and more especially to a fishing reel of the type shown in my Patent No. 2,879,954, dated March 31, 1959.

In the aforesaid patent, there is shown a fishing reel in which there is a spool for holding a length of line and a flyer rotatable about the spool, while the latter is reciprocated, carrying a retriever at its forward edge, cooperable with the forward flange of the spool to pick-up the line for the purpose of rewinding it on the spool. The proficiency of the aforesaid reel in picking up the line for rewinding is dependent upon bringing the retrieving means at the forward edge of the flyer close enough to the forward flange of the spool so that it will not fail to engage the line. In the aforesaid reel, a space is provided between the forward flange of the spool and the forward edge of the flyer which approximates the gauge of the line which is expected to be used and hence optimum operation depends, to a substantial extent, on how close the gauge of the line used corresponds to the space. Accordingly, the effectiveness of the pick-up decreases when lines of finer gauge are employed and the reel is limited in its use to a line of no greater gauge than the maximum space.

It is the principal object of this invention to provide a reel of the foregoing kind which will operate equally effectively with lines of different gauge and is accordingly adapted to accommodate lines varying in gauge from coarse to fine.

In a reel of the foregoing kind there is the usual click for effecting line control, however, after the spool is advanced with respect to the flyer, preparatory to casting, inadvertent rotation of the handle will effect retraction of the spool and hence interfere with the free flow of the line as it is cast. Such further rotation is frequently caused during casting due to the fact that the forward motion of the casting is transmitted to the handle. Accordingly, it is a further object of the invention to provide means for preventing such further rotation of the handle and hence retraction of the spool during casting.

In accordance with the first aspect of the invention, means is provided for supporting the flyer for movement axially of the spool to adjust the proximity of its forward edge and hence of the retriever relative to the forward flange of the spool, so that the space therebetween corresponds substantially to the gauge of the line being wound on the spool. Preferably the adjusting means comprises an adjusting ring rotatably mounted on a sleeve supporting the flyer having a thread thereon engaged with a fixed thread whereby rotation of the ring effects movement of the flyer axially relative to the spool.

In accordance with the second aspect of the invention, a positive one-way brake mechanism including the means for providing line control and the means for preventing rotation of the handle during casting comprises two toothed discs fixed to the drive shaft, a pawl disposed adjacent each disc, and latch means movable to any one of three different positions, a first position holding both pawls out of engagement with the disc so that the drive shaft can turn in either direction; a second position with one pawl engaged with its disc to prevent rotation of the drive shaft in a direction that would allow line to be stripped and the other disengaged from its disc; and a third position in which one pawl is disengaged from its disc and the other engaged with its disc to prevent movement of the handle in casting and hence rotation of the drive shaft so as to retract the spool.

The invention will now be described in greater detail with reference to the accompanying drawings wherein:

FIG. 1 is a side elevation of the reel shown in the position it occupies when attached to a fish pole, the latter being shown in phantom, in a substantially horizontal position;

FIG. 2 is a horizontal section taken on the line 2—2 of FIG. 1 with the spool in elevation;

FIG. 3 is an elevation, partly in section, taken on the line 3—3 of FIG. 2;

FIG. 4 is a fragmentary elevation of the ratchet and pawls which control the direction of rotation of the drive shaft, showing one pawl engaged with its ratchet to prevent the spool from being pulled forwardly by strain on the line;

FIG. 5 is a corresponding view showing the other pawl in a position to prevent retraction of the spool; and FIGS. 6 and 7 are plan views of the pawls and their actuating means shown, respectively, in FIGS. 4 and 5.

Referring to the drawings (FIG. 1), the reel has a body 10 supporting a spool 12 and a flyer 14 for reciprocation and rotation relative to each other, as will appear hereinafter, and provided with a bracket arm 16, by means of which it may be attached to a fish pole.

The body 10 (FIG. 1) comprises a bearing support for reciprocably supporting a spindle 18, one end of which is slidably disposed in a sleeve 20 set into a recess 22 at the rear end of the body 10 and the other end of which is supported by a bearing assembly 24 at the forward end of the body. The spool 12 is fixed to this latter end of the spindle 18 and has a hub 26 for receiving the line and end flanges 28 and 30.

The bearing assembly 24, at the forward end of the body, comprises an internally threaded, annular flange 32 concentric with the axis of the spindle, a supporting ring 34 externally threaded and screwed into the flange 32, a ball bearing assembly 36 rotatably mounted in the supporting ring, and a sleeve 38 disposed within the ball bearing assembly through which the spindle passes. The flyer 14, which is cup-shaped and of a diameter to receive the spool, has an end wall provided with a hub 40, by means of which the flyer is splined to the sleeve for rotation therewith between a shoulder 42, at the forward end of the sleeve, and the ball bearing assembly, the latter abutting a shoulder on the sleeve. It is apparent that by rotating the supporting ring 34 relative to the flange 32, the ball bearing assembly, sleeve and flyer may be moved axially along the spindle thereby to advance or retract the forward edge of the flyer relative to the forward flange of the spool. To facilitate such adjustment a large diameter ring 44 having a nubbed peripheral edge 45 is fixed to the supporting ring 34 adjacent the end of the flyer. A spring-pressed detent 46 is set into the body 10 (FIG. 3) for engagement with a series of depressions 48 in the ring 44 for the purpose of holding the latter in a given position of adjustment.

The line retrieving means (FIG. 1) on the flyer 14 comprises, as shown in the aforesaid patent, a finger 50 at the forward end of the flyer, defined by a slot 52 which enters the forward end and terminates in an eye 54, rearwardly of the entrance end of the slot in the direction of rotation of the flyer.

Reciprocation and rotation of the spool and flyer, respectively, is effected by a driving member in a form of a rigid disc 56 (FIG. 2), rotatably mounted within the body supporting an eccentrically disposed pin 58 engaged with a slot 60 in the spindle 18 for effecting oscillation of the latter and peripherally arranged teeth 62 meshing with teeth 64 on the sleeve 38 for effecting rotation of the flyer. The disc 56 is fixed to the inner end of a shaft 66 which extends through the wall of the body 10 and a bearing sleeve 68 integral therewith for attachment of a handle 70 thereto. As illustrated, the handle is pivotally secured to the protruding end of the shaft 66 by a pin 72 and held rigidly at right angles to the axis of the shaft by a screw 74 threaded through the handle into engagement with the end of the shaft at right angles to the axis of the pin 72.

For the purpose of line control and spool positioning, a pair of discs 76 and 78 are fixed to the shaft 66 within the body 10. The disc 76 has a plurality of teeth 80, peripherally thereof, and constitutes the line control click. The disc 78 has a single tooth 82 (FIGS. 4 and 5) and constitutes the means for achieving spool positioning according to this invention. Two pawls 84 and 86 are pivotally supported on a pin 88 adjacent the discs 76 and 78, the pawl being yieldably urged toward the discs by springs 90 and 92. A positioning latch 94 is rotatably supported on a pin 96 adjacent the pawls for rotation by a knob 98, by means of which the latch 94 may be rotated to any one of three different positions. The latch is in the form of a solid slotted member to provide cam surfaces so arranged as to control movement of the pawls 84 and 86. When the knob 98 is rotated so that the groove 100 (FIG. 4) lies opposite the rear end of the pawl 84, the forward end of the pawl engages one of the teeth 80 of the disc 76 and prevents rotation of the shaft 66 in a direction to permit the flyer to move rearwardly and hence the paying off of the line, thus enabling the angler to let go of the handle in order to net or gaff the fish without danger of the fish "taking off." The pawl 86 is, at this time, held out of engagement with the disc 78 by engagement of the cam surface 102 with its rear end. When the knob 98 is turned from the previous position, to a position in which both of the pawls 84 and 86 are held out of engagement with the discs 76 and 78 by engagement of the surfaces 104 and 106, respectively, with their rear ends, the shaft 66 can be rotated in either direction and hence the handle can be turned in either direction, either to permit the line to pay off or to take it up. When the knob 98 is rotated still further to a position in which the cam surface 108 (FIG. 5) is engaged with the pawl 84, so that the latter is held retracted from the disc 76, the slot 110 permits the pawl 86 to engage the single tooth 82 on the disc 78, fixing the position of the spool by preventing rotation of the shaft 66 in a direction to retract the spool so that the danger of snagging line during casting is minimized.

The effect of the foregoing positioning means is to provide not only the normal function of a reel, that is, free rotation in either direction for moving the spool to casting position and retrieving the line and for preventing paying off of the line when there is a strain in the line but, in addition, prevents the spool from inadvertently being retracted during casting by the momentum imparted to the handle as the cast is made which tends to rotate the shaft in a direction to retract the spool.

It should be understood that the present disclosure is for the purpose of illustration only and that this invention includes all modifications and equivalents which fall within the scope of the appended claims.

I claim:

1. In a fishing reel having a support, a spindle mounted on said support for axial reciprocation, a sleeve having a shoulder rotatably mounted on the spindle and movable axially thereof, a spool fixed to an end of the spindle, a cup-shaped flyer fixed to the sleeve so as to encompass the spool, and drive means operable to reciprocate the spool relative to the flyer and rotate the flyer relative to the spool, said flyer having a forward edge cooperable with the forward edge of the spool when the flyer is rotated to pick up a line extending from said spool; the combination of a bearing rotatably mounted on the sleeve between the flyer and the shoulder of the sleeve, an annular, internally threaded flange on the support concentric with the axis of the spindle, and an adjusting ring rotatably connected to the bearing, said ring having threaded engagement with the annular threaded flange, whereby rotation of the ring effects movement of the bearing and hence of the sleeve and flyer axially, relative to the forward edge of said spool.

2. In a fishing reel of the kind in which a spool and flyer are mounted for reciprocation and rotation relative to each other, a drive shaft operably connected thereto to effect such relative movement, and a handle connected to the drive shaft for effecting rotation thereof; the combination of means for controlling rotation of the drive shaft comprising two toothed discs fixed to the shaft, a pawl disposed adjacent each disc, and positioning means movable to any one of three different positions, a first position for holding both pawls out of engagement with the discs so that the shaft can be turned in either direction, a second position with one pawl engaged with its disc and the other disengaged to prevent rotation of the shaft in a direction to permit the backward rotation of the flyer by a strain on a line engaged therewith, and a third position in which the one pawl is disengaged and the other engaged with its disc to prevent rotation of the shaft in a direction to retract the spool.

3. In a fishing reel having a support, a spindle mounted on the support for reciprocation, a sleeve rotatably mounted on the spindle, a spool fixed to the spindle, a flyer fixed to the sleeve, a driving element rotatably supported on the support operably connected to the spindle and to the sleeve for effecting reciprocation and rotation thereof respectively, a shaft fixed to the driving element, and a handle fixed to the shaft; the combination of means for controlling the rotation of the shaft comprising two discs fixed to the shaft, one of which has a plurality of teeth thereon and the other one tooth, a pair of pawls supported adjacent the discs, and a three-position actuator operably connected to the pawls operable, in one position, to hold both pawls out of engagement with the discs so that the shaft is free to turn in either direction, in a second position to hold one pawl engaged with the multi-toothed disc and the other retracted from the single toothed disc to prevent rotation of the shaft in a direction that would allow line to be stripped from the spool, but to allow the shaft to be turned in the direction to retrieve line onto the spool, and in a third position to hold the one pawl disengaged from the multi-toothed disc and the other pawl engaged with the single toothed disc to prevent rotation of the shaft in a direction to retract the spool during the casting operation.

4. In a fishing reel having a support, a spindle mounted on the support for reciprocation, a sleeve mounted on the spindle for rotation about its axis, a spool fixed to the spindle, a flyer fixed to the sleeve, a driving element operably connected to the spindle and to the sleeve for effecting reciprocation and rotation thereof respectively, and a shaft fixed to the driving element for attachment of a handle thereto by means of which the driving element is rotated; the combination of means for controlling the direction of rotation of the shaft, comprising two discs fixed to the shaft, one of which has a plurality of teeth and the other of which has a single tooth, a pawl adjacent each disc arranged, by engagement with the teeth, to oppose rotation of the shaft, a three-position actuator having cam surfaces engaged with the pawls, and spring means yieldingly holding the pawls engaged with the cam surfaces, said actuator being rotatable, in one position, to hold both pawls retracted from the discs to permit rotation of the shaft in either direction, a second position to hold one pawl engaged with the multi-toothed disc and the other retracted from the single toothed disc to prevent rotation of the shaft in a direction to permit line to be stripped from the spool, and a third position to hold the other pawl engaged with the single toothed disc and the one pawl disengaged from the multi-toothed disc to prevent rotation of the shaft in a direction to retract the spool.

5. In a fishing reel of the kind in which a spool and flyer are mounted for reciprocation and rotation relative to each other, a drive shaft operably connected thereto to effect such relative movement, and a handle connected to the drive shaft for effecting rotation thereof; the combination of means for controlling rotation of the drive shaft comprising two discs fixed to the shaft, one disc having a plurality of teeth and the other disc having a single operative tooth, a pawl disposed adjacent each disc, and positioning means movable to any one of three different positions, a first position for holding both pawls out of the engagement with the discs so that the shaft can be turned in either direction, a second position with one pawl engaged with its respective disc and the other pawl disengaged with its respective disc so as to prevent rotation of the shaft in a direction to permit the backward rotation of the flyer by a strain on a line engaged therewith, and a third position in which the one pawl is disengaged with its respective disc and the other engaged with its respective disc so as to prevent rotation of the shaft in a direction to retract the spool.

6. In a fishing reel having a support, a spindle mounted on the support for axial reciprocation, a spool fixed to one end of the spindle having axially spaced flanges between which a line is adapted to be wound, and radial rearwardly facing shoulder on the forward flange of the spool, a sleeve mounted on the spindle for rotation about its axis and movement axially thereof, a flyer fixed to the sleeve for rotation about the spool as the latter is reciprocated, said flyer having at its forward end a forwardly facing edge concentric with the rearwardly facing shoulder on the spool, said edge being cooperable with the rearwardly facing shoulder of the spool when the flyer is rotated to pick up a line extending from said spool; the combination of an adjusting ring threaded on the support for rotation relative hereto, means rotatably mounting the adjusting ring on the sleeve, and bearings on the sleeve at opposite sides of said mounting means preventing relative endwise movement thereof on said sleeve whereby rotation of the adjusting ring effects axial movement of the sleeve on the spindle and hence axial movement of the flyer relative to the spool.

References Cited in the file of this patent
UNITED STATES PATENTS

| | | |
|---|---|---|
| 2,344,209 | Lowe | Mar. 14, 1944 |
| 2,879,954 | Small | Mar. 31, 1959 |

FOREIGN PATENTS

| | | |
|---|---|---|
| 883,184 | France | Mar. 22, 1943 |
| 487,818 | Great Britain | June 27, 1938 |